J. H. O'Neil,
Ash Sieve,
N° 48,429.   Patented June 27, 1865.
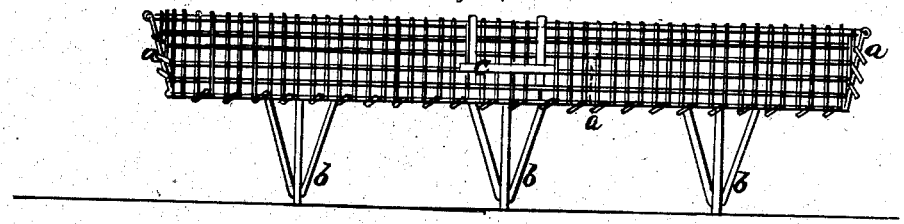
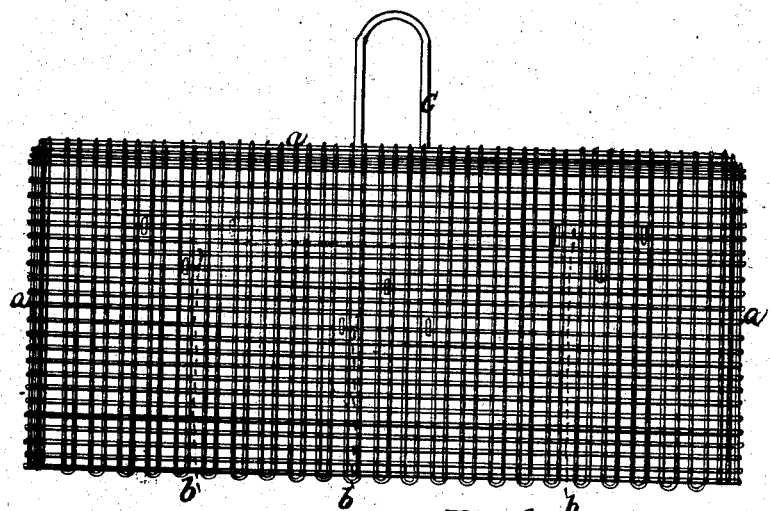
Witnesses.
Inventor

UNITED STATES PATENT OFFICE.

JOHN H. O'NEIL, OF PITTSBURG, PENNSYLVANIA.

ASH-SIFTER.

Specification forming part of Letters Patent No. 48,429, dated June 27, 1865.

*To all whom it may concern:*

Be it known that I, JOHN H. O'NEIL, of Pittsburg, in the county of Allegheny and State of Pennsylvania, have invented a new and Improved Ash-Sifter for Grates; and I do hereby declare that the following is a full, clear, and exact description thereof, which will enable others skilled in the art to make and use the same, reference being had to the accompanying drawings, forming part of this specification, in which—

Figure 1 is a front view of my invention. Fig. 2 is a plan or top view of the same.

Similar letters of reference indicate like parts.

This invention relates to a new and improved ash-sifter, constructed of wire-cloth and in form of a pan, so that it may be fitted under the grate of a fire-place and receive the ashes and cinders from the former, the ashes being allowed to pass through the sifter, while the cinders are retained within or upon it.

The pan or sifter may be constructed of a single piece of wire-cloth bent up at the ends and front, as shown at $a\ a\ a$, to form slightly-flaring sides, like an ordinary pan, the rear of the pan not having any side.

This sifter is made of a size corresponding to the dimensions of the grate or ash-pit underneath it, into which the sifter is placed, and the latter may be of square or other form, corresponding to the shape of the ash-pit.

This sifter is provided with wire feet $b$, and with a wire handle, $c$, at its front end, and the ashes and cinders which fall from the grate are received by the pan or sifter. By slightly tapping the sifter the ashes will pass through it, but the cinders will be retained, and the pan or sifter may be readily withdrawn at any time from underneath the grate and the cinders thrown upon the fire, the handle, in consequence of the device being all made of wire, not getting so hot that it cannot be grasped by the hand.

Thus, by this simple and inexpensive device, much labor and annoyance are saved in using cinders, for the latter are sifted from the ashes as they drop from the grate, and the ashes in passing through the sifter do not create any dust, a slight tapping of the pan or sifter with a poker being sufficient to effect the sifting operation.

I claim as new and desire to secure by Letters Patent—

As an improved article of manufacture, the ash-sifter constructed with its entire sides and bottom of wire-cloth, and provided with feet $b\ b\ b$ and handle $c$, all as herein described, and for the purposes set forth.

JOHN H. O'NEIL.

Witnesses:
A. S. NICHOLSON,
I. R. CAMERON.